(12) United States Patent
Oh

(10) Patent No.: US 12,049,914 B2
(45) Date of Patent: Jul. 30, 2024

(54) CAP FOR WATERPROOFING NAIL

(71) Applicant: SINSEUNG Precision Co., Ltd., Hwaseong-si (KR)

(72) Inventor: Dong Hwan Oh, Hwaseong-si (KR)

(*) Notice: Subject to any disclaimer, the term of this patent is extended or adjusted under 35 U.S.C. 154(b) by 268 days.

(21) Appl. No.: 17/512,342

(22) Filed: Oct. 27, 2021

(65) Prior Publication Data

US 2022/0186767 A1 Jun. 16, 2022

(30) Foreign Application Priority Data

Dec. 10, 2020 (KR) .................. 10-2020-0171931

(51) Int. Cl.
*F16B 43/00* (2006.01)
*F16B 15/00* (2006.01)
*F16B 33/00* (2006.01)

(52) U.S. Cl.
CPC ............ *F16B 33/004* (2013.01); *F16B 15/00* (2013.01)

(58) Field of Classification Search
CPC .................................................. F16B 43/001
USPC ........................................................ 411/542
See application file for complete search history.

(56) References Cited

U.S. PATENT DOCUMENTS

| | | | | |
|---|---|---|---|---|
| 2,706,656 A * | 4/1955 | Roubal | .................. | F16B 43/001 |
| | | | | 277/637 |
| 4,467,581 A * | 8/1984 | Francovitch | ............ | E04D 5/143 |
| | | | | 52/410 |
| 4,686,808 A * | 8/1987 | Triplett | .................. | E04D 5/145 |
| | | | | 52/410 |
| 4,780,039 A * | 10/1988 | Hartman | ................ | F16B 43/00 |
| | | | | 411/533 |
| 5,407,313 A | 4/1995 | Bruins | | |
| 5,755,545 A * | 5/1998 | Banks | .................. | E04D 3/3606 |
| | | | | 411/533 |
| 2021/0301861 A1* | 9/2021 | Matsueda | ............. | F16B 11/006 |

FOREIGN PATENT DOCUMENTS

| | | | |
|---|---|---|---|
| JP | 2001-140845 A | | 5/2001 |
| JP | 2011-084947 A | | 4/2011 |
| KR | 10-0374722 | | 3/2003 |
| KR | 20-0381875 | | 4/2005 |

OTHER PUBLICATIONS

English Specification of JP2001-140845A.
English Specification of JP2011-084947A.
English Specification of 10-0374722.
English Specification of 20-0381875.

* cited by examiner

*Primary Examiner* — Flemming Saether
(74) *Attorney, Agent, or Firm* — ANTONIO HA & U.S. PATENT, LLC

(57) ABSTRACT

According to an embodiment, a cap for waterproofing a nail comprises a cap body and a tightening protrusion. The cap body includes a flat penetration portion and an edge portion extending from the penetration portion and inclined downward. The cap body is formed of a hard material which may be penetrated by a nail. The tightening protrusion is spaced apart inward from an end of the edge portion by a predetermined distance and protruding downward from a lower surface of the cap body. A thickness of the tightening protrusion is smaller than a thickness of the edge portion.

2 Claims, 6 Drawing Sheets

CAP FOR WATERPROOFING NAIL

CROSS-REFERENCE TO RELATED APPLICATION

This application claims priority to Korean Patent Application No. 10-2020-0171931 filed in the Korean Intellectual Property Office on Dec. 10, 2020, the disclosure of which is incorporated by reference herein in its entirety.

TECHNICAL FIELD

The disclosure relates to a cap for waterproofing a nail, and more particularly, a cap for waterproofing a nail, which is interposed between the nail and a building material, such as wood, a panel, or slate, to prevent damage to the building material and the infiltration of rainwater when pegging the building material with the nail.

DISCUSSION OF RELATED ART

A nail is an object used to fasten one or more objects together and is typically made of steel. Nails are mainly used for fastening wood and are also used in plastics, stone walls, bricks, and concrete.

Nails used to fasten the slate to the roof of a building, nails used for brick or concrete walls, and nails used for fastening a plastic cover to wood or plywood are vulnerable to corrosion and water leakage because they are directly exposed to rainwater. Further, the nailed part of plastic cover, brick, or concrete may be torn or damaged by impact. A rubber nail waterproofing cap is interposed between the nail and the building material for the purpose of preventing damage to the building material and infiltration of rainwater.

Korean Patent No. 10-0374722, titled "Roofing Washer Manufacturing Method," and Utility Model Registration No. 20-0381875, titled "Metal and Attachment Screws" disclose conventional nail waterproofing caps.

The conventional nail waterproofing caps have a flat cylindrical shape. It is formed of soft rubber, and its lower surface contacting the building material is flat, thus absorbing shocks between the nail and the building material.

However, as the lower contact surface is flat, the conventional nail waterproofing cap has relatively reduced tightening pressure and poor watertightness. Further, since it has a place for insertion of a nail previously formed in the center, it cannot be used for nails in a diversity of sizes and the position for nailing is limited.

Further, by its material, soft rubber, the conventional nail waterproofing cap may experience severe deformation after nailing. Thus, the nailed plastic cover may be pushed and torn by the cap, and a portion of the cap may be lifted while the cap is deformed, leading to infiltration of rainwater.

SUMMARY

According to an embodiment, there may be provided a cap for waterproofing a nail, which may maintain high watertightness, allow for use of nails in various sizes without the position where it is nailed, experience less deformation when nailing, and may be easily manufactured by injection molding.

According to an embodiment, a cap for waterproofing a nail comprises a cap body and a tightening protrusion. The cap body includes a flat penetration portion and an edge portion extending from the penetration portion and inclined downward. The cap body is formed of a hard material which may be penetrated by a nail. The tightening protrusion is spaced apart inward from an end of the edge portion by a predetermined distance and protruding downward from a lower surface of the cap body. A thickness of the tightening protrusion is smaller than a thickness of the edge portion. The end of the edge portion extends downward beyond an end of the tightening protrusion. When the nail is inserted through the penetration portion of the cap body, the end of the edge portion is primarily tightened to a target object, and then, the end of the tightening protrusion is pressed by a nail head of the nail and secondarily tightened to the target object. Three portions of the cap body are tightened to the target object, the three portions including a portion of the lower surface of the cap body, the end of the edge portion, and the end of the tightening protrusion.

The penetration portion may include a nail penetration portion penetrated by the nail and a surrounding portion which are pushed outside by the insertion of the nail. At least one groove may be formed adjacent to the surrounding portion.

The cap body may be manufactured in a row along with at least one other cap body by injection molding. Connection necks may be formed on two opposite sides of the edge portion of the cap body. The plurality of injection-molded cap bodies may be continuously manufactured in a state of being connected to each other by the connection necks.

In the nail waterproofing cap configured according to the embodiments of the disclosure, the edge portion of the cap body serves as an outer blocking wall, and the tightening protrusion serves as an inner blocking wall to thereby provide a dual watertight structure, maintaining high watertightness.

In particular, as the cap body is formed of a hard material that is less deformed, the nail waterproofing cap may prevent damage to the target object and enhance watertightness regardless of the size of the nail or where the nail is inserted.

Further, as a plurality of cap bodies are continuously formed in a state in which they are connected with each other by the connection necks, it is possible to manufacture, transport, winding, or pack nail waterproofing caps in package units.

BRIEF DESCRIPTION OF THE DRAWINGS

FIGS. 6a and 6b are enlarged views illustrating an edge portion and a tightening protrusion of the nail waterproofing cap of FIG. 5a.

DETAILED DESCRIPTION

Hereinafter, embodiments of the disclosure are described with reference to the accompanying drawings. When determined to make the gist of the disclosure unclear, a description of the prior art is omitted.

Figure 1:
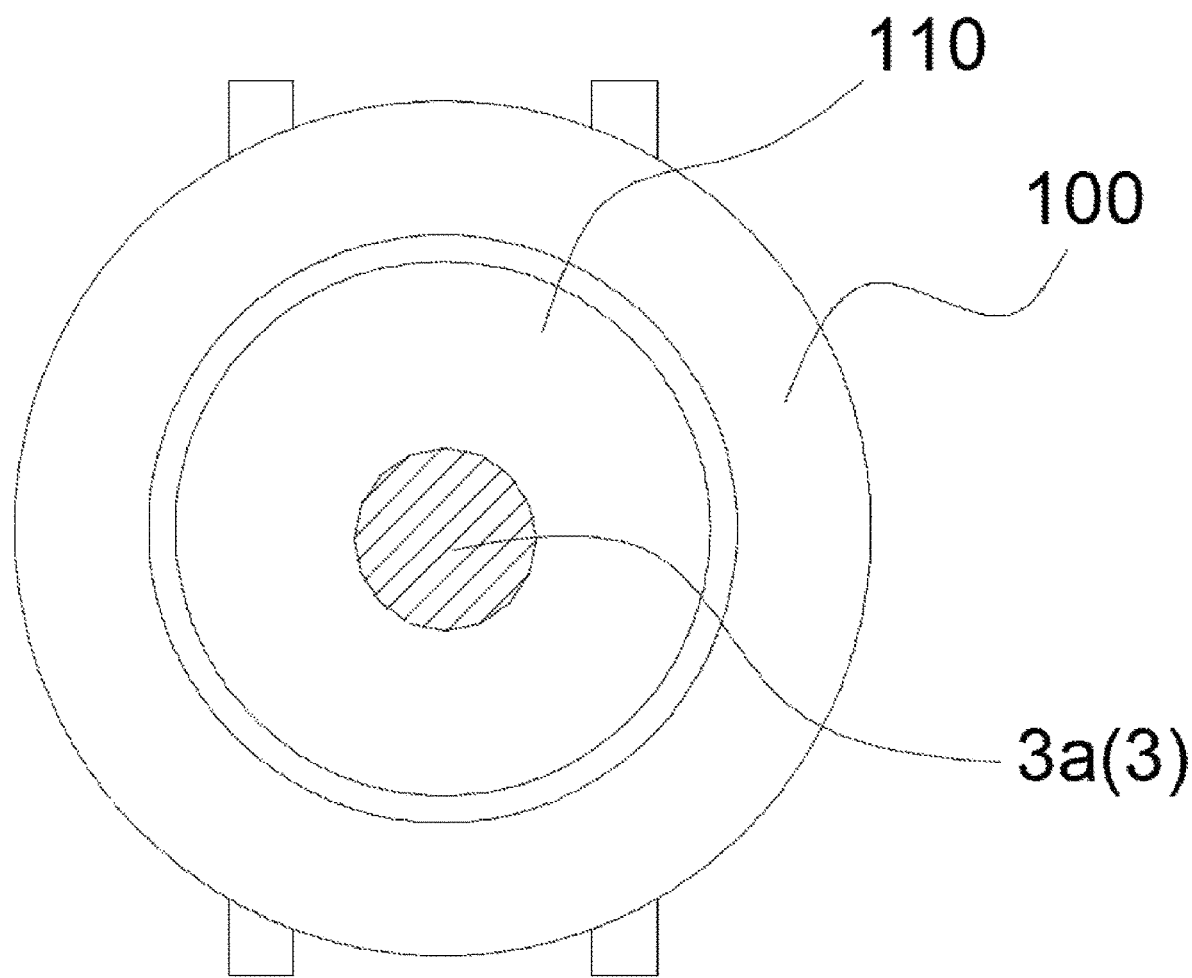
FIG. 1 is a plan view illustrating a nail waterproofing cap according to an embodiment.
Figure 2:
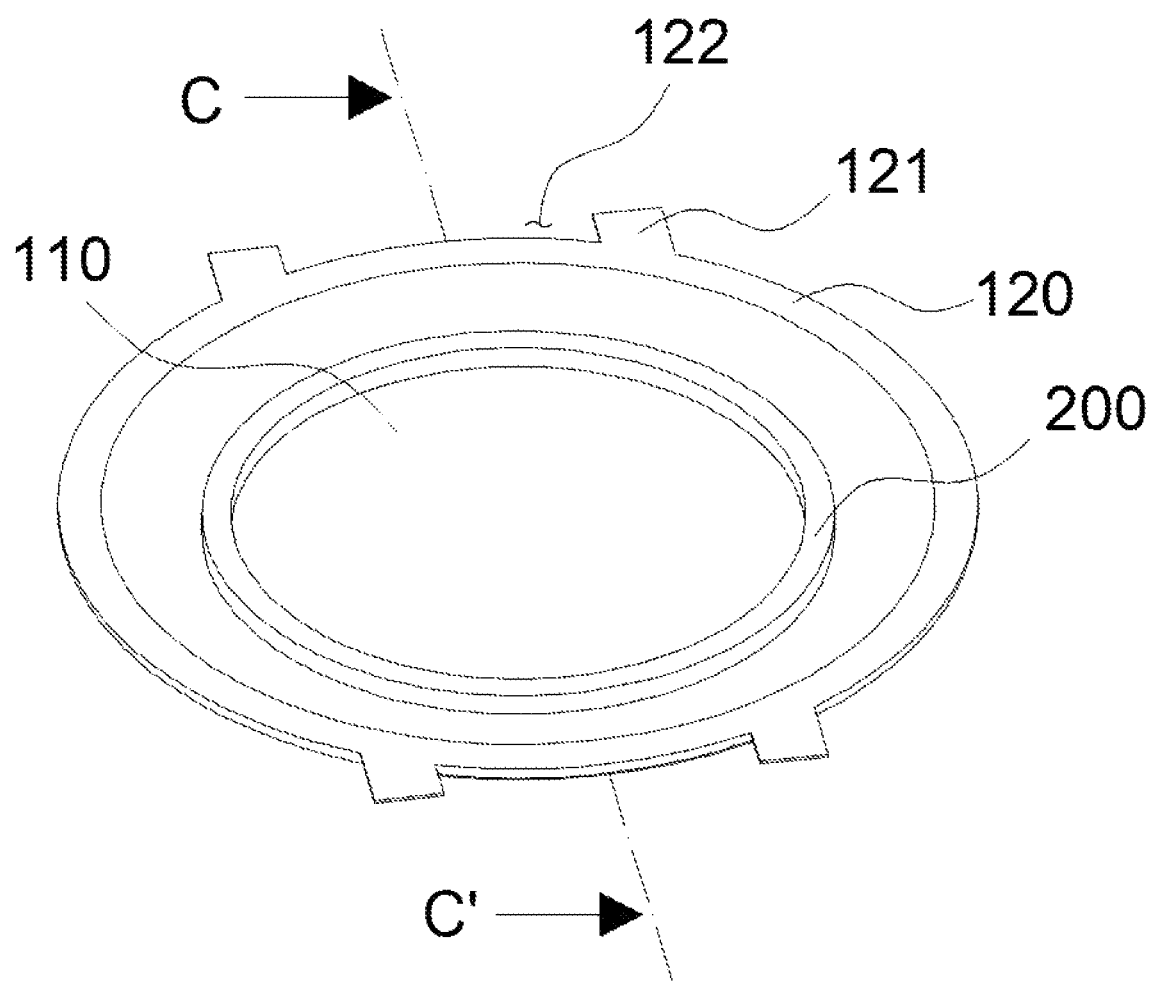
FIG. 2 is a perspective bottom view illustrating the nail waterproofing cap of FIG. 1.

FIG. 1 is a plan view illustrating a nail waterproofing cap according to an embodiment. FIG. 2 is a perspective bottom view illustrating the nail waterproofing cap of FIG. 1. FIG.

Figure 4A:
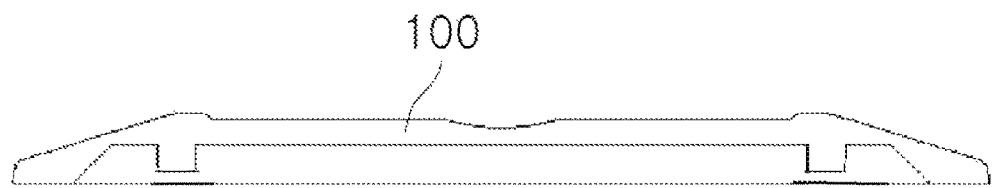
FIGS. 4a and 4b are views illustrating states of the nail waterproofing cap of FIG. 1 before and after nailing.
Figure 4B:
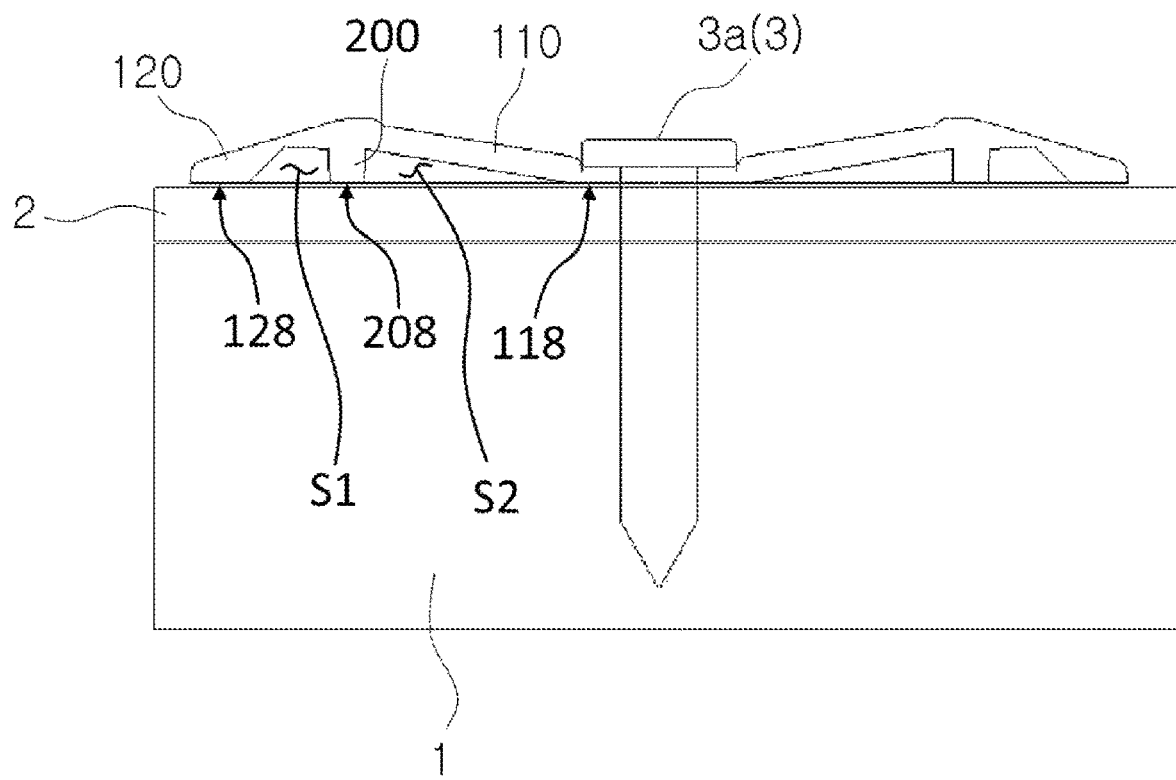
Figure 5A:
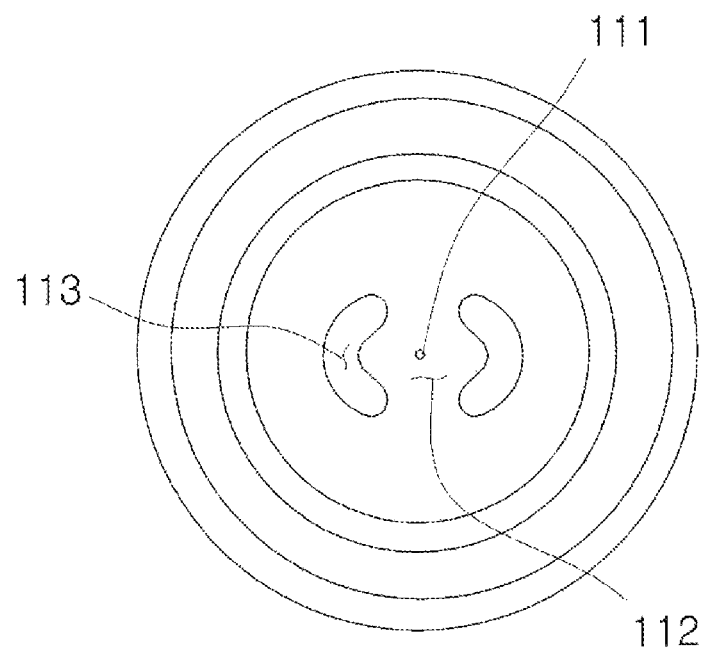
FIGS. 5a and 5b are views illustrating an example of deformation of the nail waterproofing cap of FIG. 1.
Figure 5B:
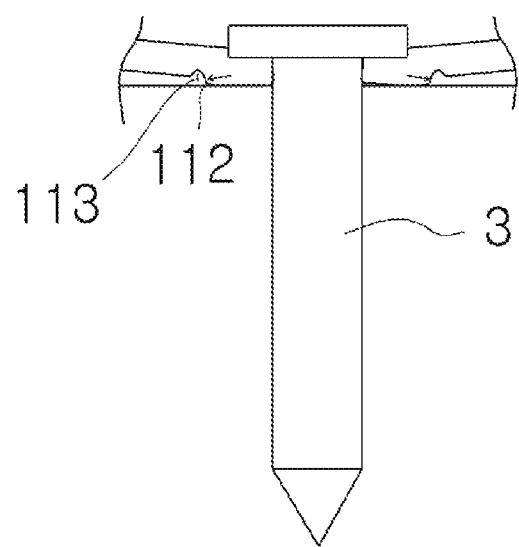
Figure 6A:
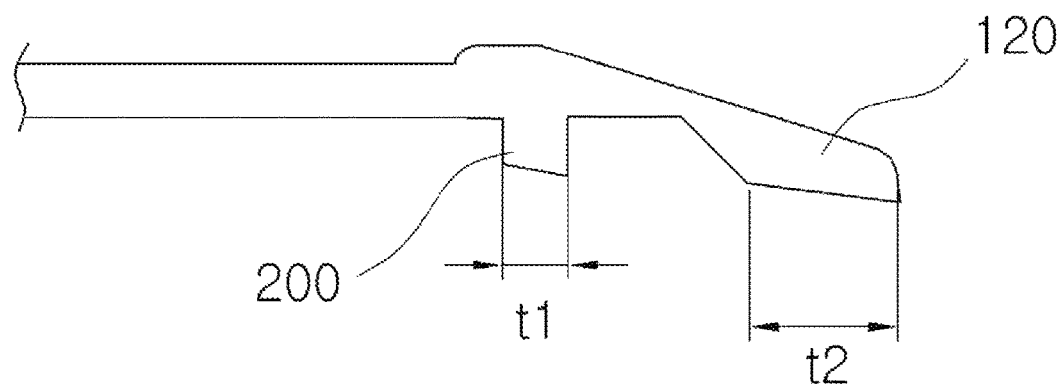
Figure 6B:
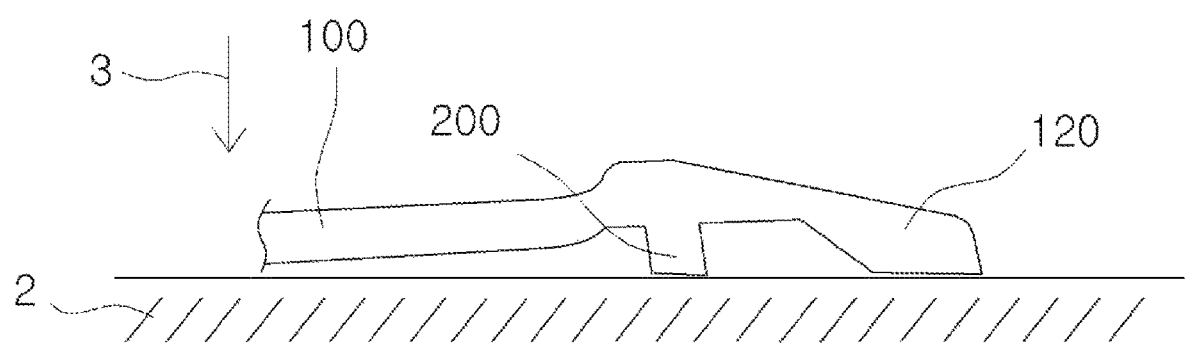

3 is a cross-sectional view taken along line C-C' of FIG. 2. FIGS. 4a and 4b are views illustrating states of the nail waterproofing cap of FIG. 1 before and after nailing. FIGS. 5a and 5b are views illustrating an example of deformation of the nail waterproofing cap of FIG. 1. FIGS. 6a and 6b are enlarged views illustrating an edge portion and a tightening protrusion of the nail waterproofing cap of FIG. 5a.

Referring to FIGS. 1 and 2, according to an embodiment, a cap for waterproofing a nail (which is also simply referred to as a 'nail waterproofing cap' throughout the specification) is interposed between the nail and a building material, such as wood, a panel, or slate, to prevent damage to the building material and infiltration of rainwater when nailing the building material. The nail waterproofing cap includes a cap body 100 and a tightening protrusion 200.

Figure 3:
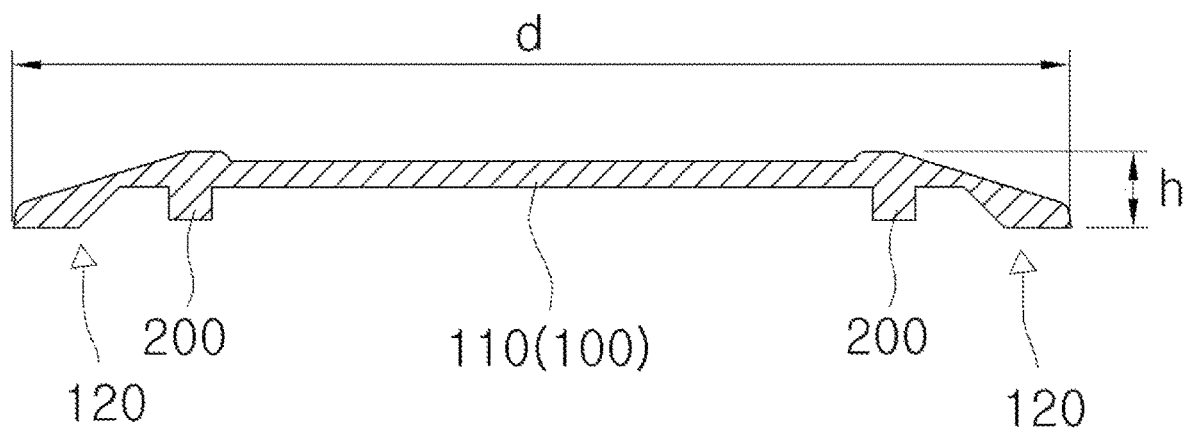
FIG. 3 is a cross-sectional view taken along line C-C' of FIG. 2.

Referring to FIG. 3, the cap body 100 includes a flat penetration portion 110 and an edge portion 120 extending from the penetration portion 110 to the periphery and inclined downward. The cap body 100 is formed of hard plastic to be penetrated by a nail 3 (refer to FIG. 4b).

The cap body 100 has a circular shape. The edge portion 120 and the tightening protrusion 200 are positioned a predetermined distance apart from the center of the penetration portion 110.

As the nail is inserted through the center of the penetration portion 110, a uniform pressure is applied throughout the edge portion 120 and the tightening protrusion 200, thus maintaining the watertightness of the cap body 100 more stably.

As shown in FIG. 3, the ratio of diameter d to height h of the cap body 100 is 10 to 20:1, so that the cap body 100 overall has a flat shape.

If the cap body 100 is formed to be too flat by falling outside the ratio, the space for forming the tightening protrusion 200 may be insufficient, and the range of deformation of the penetration portion 110 may be relatively reduced, thus deteriorating the tightening effect of the edge portion 120 and the tightening protrusion 200. Conversely, if the cap body 100 falls outside the ratio and is thus too thick, the cap body 100 shaped to be curved downwards may be bent reversely, causing the edge portion 120 to lift.

The tightening protrusion 200 is spaced apart inward from an end of the edge portion 120 by a predetermined distance and protrudes from the lower surface of the cap body 100.

A process of inserting a nail into a nail waterproofing cap is described below, according to an embodiment.

Referring to FIGS. 4a and 4b, a target object 2 to fasten is brought in tight contact to a hard body 1 to which the target object 2 is to be fastened, and the cap body 100 is placed on the target object 2. In this state, a nail 3 is inserted through the penetration portion 110 of the cap body 100.

Thus, the center of the penetration portion 110 is pushed by the nail head 3a and is thus pressed toward the target object 2, and the end of the edge portion 120 is brought in tight contact to the target object 2.

In this case, as shown in FIGS. 5a and 5b, a nail penetration portion 111 penetrated by the nail 3 and its surrounding portion 112, of the penetration portion 110, are pushed outward according to the penetration of the nail 3. For more smooth penetration of the nail 3, at least one groove (or recess) 113 may be formed around the penetration portion 110 and adjacent to the surrounding portion 112.

The groove 113 may provide a room to allow the nail penetration portion 111 and the surrounding portion 112 to be pushed away, so that the penetration of the nail 3 may be further smoothly performed.

Although arc-shaped grooves 113 adjacent to the surrounding portion 112 are shown in the drawings, the grooves 113 may be formed in other various shapes, e.g., circles, open circles or rings, rectangles, or squares.

If insertion of the nail 3 continues, the center of the penetration portion 110 may be completely tightened to the target object 2 as shown in FIG. 4b. Simultaneously, the tightening protrusion 200, influenced by the penetration portion 110, may also be pushed down and tightened to the target object 2. Resultantly, two sealed-off spaces S1 and S2 are formed under the lower surface of the cap body 100.

Preferably, the thickness t1 of the tightening protrusion 200 is smaller than the thickness t2 of the end of the edge portion 120 as shown in FIG. 6a. This is because the edge portion 120 is first tightened to the target object 2 and may be continuously impacted by pounding the nail 3 and thus requires relatively high rigidity.

Preferably, the end of the edge portion 120 extends downward beyond the lower end of the tightening protrusion 200. This is because the edge portion 120 is not subjected to a change in height while being tightened to the target object 2, but the tightening protrusion 200 adjacent to the center of the penetration portion 110 is tightened to the target object 2 by being influenced by pounding the nail 3. In other words, the tightening protrusion 200 experiences a change in height.

Simultaneously with a change in the height of the tightening protrusion 200, the edge portion 120 and the tightening protrusion 200 are pushed outside and spread. In other words, the edge portion 120 and the tightening protrusion 200 are curved slightly away from the center of the penetration portion 110.

As the ends of the edge portion 120 and the tightening protrusion 200 are overall tightened to the target object 2, watertightness may be further enhanced. To that end, it is preferable that the ends of the edge portion 120 and the tightening protrusion 200 are cut at a predetermined angle toward the center of the penetration portion 110.

As the lower contact surface is flat, the conventional nail waterproofing cap has relatively reduced tightening pressure and poor watertightness. Further, since the conventional nail waterproofing cap has a place for insertion of a nail previously formed in the center, it cannot be used for nails in a diversity of sizes and the position for nailing is limited.

By its material, soft rubber, the conventional nail waterproofing cap may experience severe deformation after nailing. Thus, the nailed plastic cover may be pushed and torn by the cap, and a portion of the cap may be lifted while the cap is deformed, leading to infiltration of rainwater and damage to the target object.

In contrast, according to an embodiment, the edge portion 120 serves as an outer blocking wall, and the tightening protrusion 200 serves as an inner blocking wall to thereby provide a dual watertight structure, maintaining high watertightness.

In particular, as the cap body 100 is formed of a hard material that allows insertion of the nail 3 and is less deformed upon nailing, the nail waterproofing cap may prevent damage to the target object and enhance watertightness regardless of the size of the nail or where the nail is inserted. Meanwhile, it is preferable in a manufacturing and transporting point of view that multiple cap bodies 100 are manufactured in a row by injection molding.

To this end, as illustrated in FIG. 2, a plurality of connection necks 121 are formed on two opposite sides of the edge portion 120 of the cap body 100.

A through hole 122 for fixing the core of the injection mold may be formed between the plurality of connection necks 121, and although not shown, the portion where the connection necks 121 meet each other is preferably bent in a V-cut shape.

As such, as a plurality of cap bodies 100 are continuously formed in a state in which they are connected with each other by the connection necks 121, it is possible to manufacture, transport, winding, or pack nail waterproofing caps in package units.

In the nail waterproofing cap configured as described above, the edge portion of the cap body serves as an outer blocking wall, and the tightening protrusion serves as an inner blocking wall to thereby provide a dual watertight structure, maintaining high watertightness.

In particular, as the cap body is formed of a hard material that is less deformed, the nail waterproofing cap may prevent damage to the target object and enhance watertightness regardless of the size of the nail or where the nail is inserted.

Further, as a plurality of cap bodies are continuously formed in a state in which they are connected with each other by the connection necks, it is possible to manufacture, transport, winding, or pack nail waterproofing caps in package units.

While the disclosure is shown and described in connection with embodiments thereof, it would be appreciated by one of ordinary skill in the art that various changes or modifications may be made thereto without departing from the scope of the disclosure.

What is claimed is:

1. A cap for waterproofing a nail, the cap comprising:
   a cap body including a flat penetration portion and an edge portion extending from the penetration portion and inclined downward, the cap body formed of a hard material which is adapted to be penetrated by the nail; and
   a tightening protrusion spaced apart inward from an end of the edge portion by a predetermined distance and protruding downward from a lower surface of the cap body, wherein a width of the tightening protrusion is smaller than a width of the edge portion, wherein the end of the edge portion extends downward beyond an end of the tightening protrusion, the end of the edge portion is primarily tightened to a target object, and then, the end of the tightening protrusion is pressed by a nail head of the nail and secondarily tightened to the target object, and wherein three portions of the cap body are tightened to the target object, the three portions including a portion of the lower surface of the cap body, the end of the edge portion, and the end of the tightening protrusion,
   wherein the penetration portion includes a nail penetration portion that is adapted to be penetrated by the nail and a surrounding portion, the nail penetration portion and the surrounding portion are adapted to be pushed away by the penetration of the nail,
   wherein at least one groove is formed adjacent to the surrounding portion to provide a room to allow the nail penetration portion and the surrounding portion to be pushed away,
   wherein the ends of the edge portion and the tightening protrusion are cut at an acute angle toward the center of the penetration portion, and
   wherein the nail penetration portion is at the center of the cap.

2. The cap of claim 1, wherein the cap body is manufactured in a row along with at least one other cap body by injection molding, wherein connection necks are formed on two opposite sides of the edge portion of the cap body, and wherein the plurality of injection-molded cap bodies are continuously manufactured in a state of being connected to each other by the connection necks.

* * * * *